（12）United States Patent
Leclercq et al.

(10) Patent No.: US 9,179,437 B2
(45) Date of Patent: Nov. 3, 2015

(54) METHOD AND SYSTEM FOR FEMTOCELL POSITIONING USING LOW EARTH ORBIT SATELLITE SIGNALS

(71) Applicant: Maxlinear, Inc., Carlsbad, CA (US)

(72) Inventors: Maxime Leclercq, Carlsbad, CA (US); Ioannis Spyropoulos, Carlsbad, CA (US); Nishant Kumar, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 14/589,781

(22) Filed: Jan. 5, 2015

(65) Prior Publication Data
US 2015/0126183 A1 May 7, 2015

Related U.S. Application Data

(63) Continuation of application No. 13/587,193, filed on Aug. 16, 2012, now Pat. No. 8,938,231.

(60) Provisional application No. 61/569,359, filed on Dec. 12, 2011.

(51) Int. Cl.

| | |
|---|---|
| *H04W 4/00* | (2009.01) |
| *G01S 19/38* | (2010.01) |
| *H04W 64/00* | (2009.01) |
| *H04W 4/02* | (2009.01) |
| *G01S 19/42* | (2010.01) |
| *G01S 19/13* | (2010.01) |
| *H04B 7/185* | (2006.01) |
| *H04W 84/04* | (2009.01) |

(52) U.S. Cl.
CPC .............. *H04W 64/003* (2013.01); *G01S 19/13* (2013.01); *G01S 19/425* (2013.01); *H04B 7/18554* (2013.01); *H04W 4/021* (2013.01); *H04W 84/045* (2013.01)

(58) Field of Classification Search
CPC ....... H04B 7/185; H04L 63/08; H04W 64/00; G01S 19/38; G01S 19/48
USPC .......................................... 370/331; 375/144
See application file for complete search history.

(56) References Cited

U.S. PATENT DOCUMENTS

| 6,085,090 | A   | * | 7/2000  | Yee et al. ....................... 455/440 |
|-----------|-----|---|---------|-------------------------------------------|
| 7,042,392 | B2  | * | 5/2006  | Whelan et al. ............. 342/357.29 |
| 7,489,926 | B2  | * | 2/2009  | Whelan et al. ................ 455/427 |
| 8,457,684 | B2  | * | 6/2013  | Flanangan .................. 455/552.1 |
| 2009/0180439 | A1 | * | 7/2009  | Tabery et al. .................. 370/331 |
| 2010/0260145 | A1 | * | 10/2010 | Voyer et al. ................... 370/331 |
| 2010/0265128 | A1 | * | 10/2010 | Martens et al. ........... 342/357.25 |
| 2011/0117922 | A1 | * | 5/2011  | Reitsma ..................... 455/456.1 |
| 2012/0162013 | A1 | * | 6/2012  | Piersol et al. .................. 342/386 |
| 2013/0107910 | A1 | * | 5/2013  | Leclercq et al. .............. 375/144 |
| 2013/0172005 | A1 | * | 7/2013  | Finlow-Bates et al. .... 455/456.1 |

* cited by examiner

*Primary Examiner* — William Nealon
(74) *Attorney, Agent, or Firm* — McAndrews, Held & Malloy, Ltd.

(57) ABSTRACT

Methods and systems for femtocell positioning using low Earth orbit (LEO) satellite signals may comprise receiving LEO RF satellite signals utilizing a LEO satellite signal receiver path when medium Earth orbit (MEO) signals are attenuated below a threshold needed for positioning purposes by the MEO receiver path. A position of said wireless communication device (WCD) may be measured based on the received LEO RF satellite signals. The measured position of the WCD may be compared to a threshold radius defined by a stored initial position. Wireless communication services to the other WCDs may be enabled when the measured position is within the threshold radius. Reentry of the stored initial position may be requested when the measured position is outside of the threshold radius. The WCD may be disabled when the measured position of the WCD falls outside of the threshold radius more than a predetermined number of times.

22 Claims, 10 Drawing Sheets

METHOD AND SYSTEM FOR FEMTOCELL POSITIONING USING LOW EARTH ORBIT SATELLITE SIGNALS

CROSS-REFERENCE TO RELATED APPLICATIONS/INCORPORATION BY REFERENCE

This application is a continuation of Application Ser. No. 13/587,193 filed on Aug. 16, 2012, which makes reference to and claims priority to Provisional Application No. 61/569,359 filed on Dec. 12, 2011. Each of the above stated application is hereby incorporated herein by reference in its entirety.

The above indicated application is hereby incorporated herein by reference in its entirety.

FIELD OF THE INVENTION

Certain embodiments of the invention relate to wireless communication. More specifically, certain embodiments of the invention relate to a method and system for femtocell positioning using low Earth orbit satellite signals.

BACKGROUND OF THE INVENTION

Global navigation satellite systems (GNSS) such as the NAVSTAR global positioning system (GPS) or the Russian GLONASS provide accurate positioning information for a user anywhere on Earth that GNSS signals may be received. GNSS satellites are medium earth orbit satellites, about 12,000 miles above the surface. Highly accurate GNSS clock signals from these satellites may be used to accurately determine the position of a receiver.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for femtocell positioning using low Earth orbit satellite signals, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for femtocell positioning using low Earth orbit satellite signals. Exemplary aspects of the invention may comprise receiving an initial position of a wireless communication device as entered by as user, manufacturer of the wireless device, or a service provider, wherein said wireless communication device comprises a low Earth orbit (LEO) satellite signal receiver path. The wireless communication device may be operable to provide wireless communication services to other wireless communication devices. LEO RF satellite signals may be received utilizing the LEO satellite signal receiver path and a position of the wireless communication device may be measured based on the received LEO RF satellite signals. The measured position of the wireless communication device may be compared to a threshold radius defined by the initial position and the wireless communication services to the other wireless communication devices may be enabled when the measured position is within the threshold radius. Reentry of the initial position may be requested when the measured position is outside of the threshold radius and the wireless communication device may be disabled when the measured position of the wireless communication device falls outside of the threshold radius more than a predetermined number of times. The wireless communication device may comprise a femtocell device, a WiFi access point, or may provide cellular telephone service to the other wireless communication devices. The position of the wireless device may be measured upon powering up of the wireless communication device. The position of the wireless device may be measured on a periodic basis. The position of the wireless communication device may be measured when one or more motion sensors in the wireless communication device detect motion. The wireless communication device may be controlled by a reduced instruction set computing (RISC) central processing unit (CPU).

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1A:
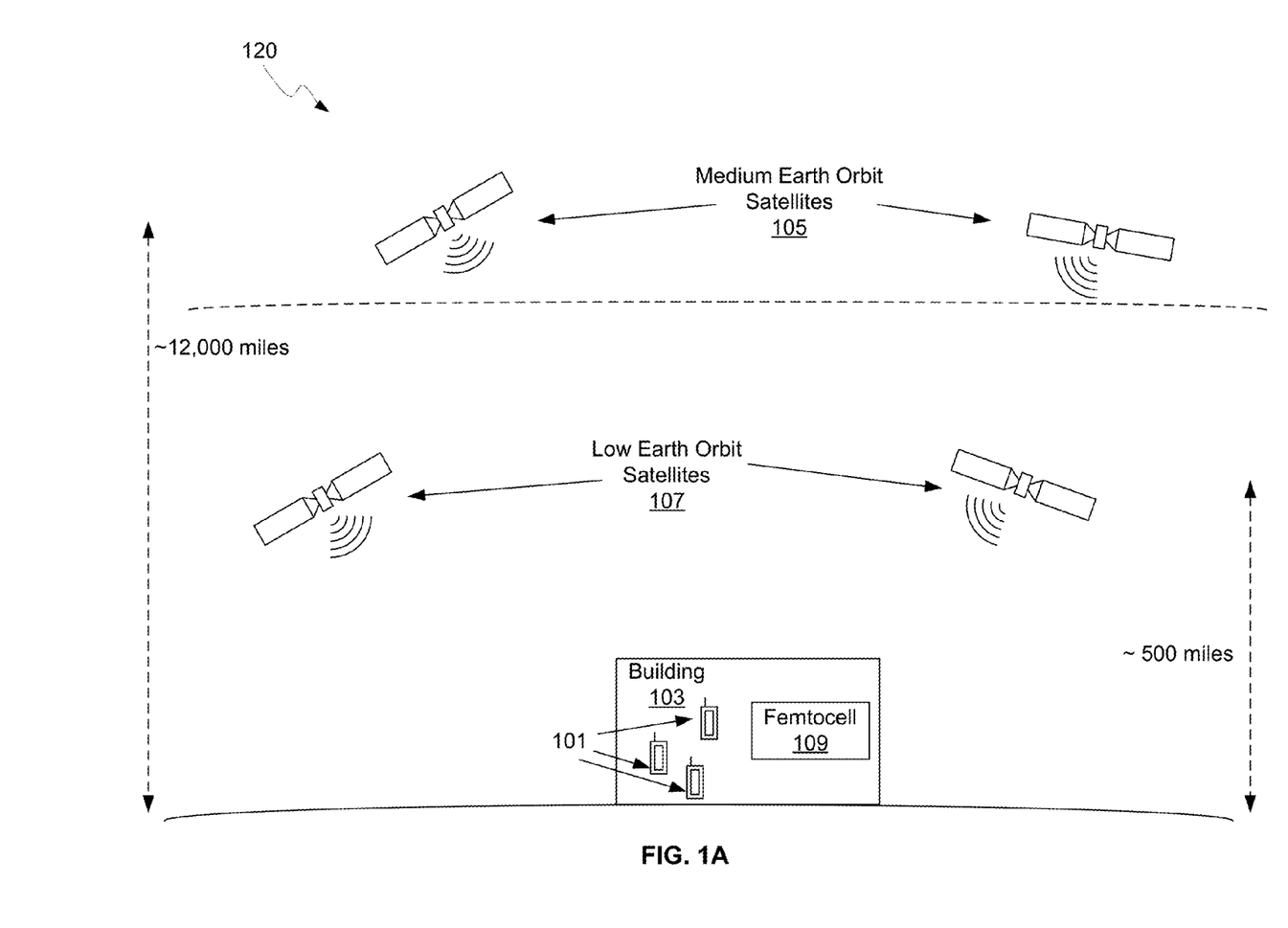
FIG. 1A is a diagram of an exemplary dual mode femtocell system in accordance with an embodiment of the invention.

FIG. 1A is a diagram of an exemplary dual mode femtocell system in accordance with an embodiment of the invention. Referring to FIG. 1A, there is shown a satellite navigation system 100 comprising a plurality of wireless communication devices 101, a building 103, medium Earth orbit (MEO) satellites 105, low Earth orbit (LEO) satellites 107, and a femtocell 109. There is also shown the approximate height in miles of medium Earth and low Earth satellites of ~12,000 miles and ~500 miles, respectively.

The wireless communication devices 101 and the femtocell 109 may comprise any device or vehicle (e.g. smart phone) where its user may desire to know the location of such device or vehicle. The femtocell 109 may also comprise a wireless communication device, but one that is operable to provide wireless communication services to other wireless communication devices. Accordingly, the femtocell 109 may comprise a global navigation satellite system (GNSS) receiver having a configurable RF path that may be operable to receive medium Earth orbit (MEO) satellite signals and low Earth orbit (LEO) satellite signals. In another exemplary scenario, the femtocell 109 may comprise two RF paths to receive different satellite signals.

The MEO satellites 105 may be at a height of about 12,000 miles above the surface of the Earth, compared to about 500 miles above the surface for the LEO satellites 107. Therefore, the signal strength of LEO satellite signals is much stronger than MEO satellite signals. The LEO satellites 107 may typically be used for telecommunication systems, such as satellite phones, whereas the MEO satellites 105 may be utilized for location and navigation applications.

In certain circumstances, MEO signals, such as GPS signals, may be attenuated by buildings, such as the building 103, or other structures to such an extent that GPS receivers cannot obtain a lock to any GPS satellites. However, due to the stronger signal strength of LEO satellite signals, the LEO signals may be utilized by devices to supplement or substitute the MEO systems in the devices. However, the frequencies utilized for MEO and LEO satellite communication are not the same, so a conventional GPS receiver cannot process LEO signals such as Iridium signals.

In an exemplary embodiment, the femtocell 109 may be operable to receive both LEO satellite signals, such as Iridium signals, and MEO signals, such as GPS signals. In this manner, the receiver may be able to determine the user's location despite having high attenuation of GPS signals to below that of the sensitivity of the receiver. Thus, the femtocell 109 may be able to accurately determine its location by receiving either or both Iridium and GPS satellite signals. This may be enabled by utilizing separate RF paths, one path configured to receive MEO signals and the other path configured to receive LEO satellite signals.

In an exemplary scenario, the two separate RF paths may share some front-end components, such as an antenna, low-noise amplifier (LNA), and a splitter, for example. In this scenario, the shared front-end components may comprise enough bandwidth to process both MEO and LEO signals. In another exemplary scenario, the wireless device may utilize separate front-end components. Furthermore, in instances where only one type of signal is to be received, the inactive RF path may be powered down to conserve power.

In yet another exemplary scenario, the separate RF paths may be time-division duplexed (TDD), or selectively enabled, such that both MEO and LEO signals may be received, but at alternating times. This may enable MEO-assisted LEO positioning or LEO-assisted MEO positioning, for example. The femtocell 109 may comprise a blanking or switching module for enabling TDD signal reception, where the TDD process may be carried out in the digital domain. For example, the MEO, or GPS, processing path may be blanked, i.e. set to and held at the last sampled value, while the LEO path receives and demodulates LEO signals.

In an exemplary embodiment, the femtocell 109 may comprise a dual mode receiver that may be operable to receive LEO satellite signals, such as Iridium signals. In this manner, the receiver may be able to determine the location of the femtocell 109 in the building 103 despite having high attenuation of GPS signals to below that of the sensitivity of the receiver. Thus, the femtocell 109 may be able to accurately determine its location by receiving both GPS and Iridium satellite signals. This may be enabled by utilizing a configurable PLL to switch to a LEO satellite signal when MEO signals are attenuated by intervening structures, such as when the femtocell 109 is operated inside a building where GPS signals are insignificant. The configurable receiver is described further with respect to FIGS. 2A-5. Furthermore, the receiver may comprise separate RF receiver paths for MEO and LEO signals, which may be selected in a time division multiplexing fashion, for example.

Determining the location of a wireless device using stronger LEO satellite signals, particularly when coarse location is acceptable, uses much less power than weaker MEO (e.g. GPS) satellite signals, particularly with fine location calculations. Furthermore, the receiver can vary the number of satellites used, and thus the on-time for the LEO RF path, when coarse location is acceptable. Conversely, when higher accuracy is desired, more satellites may be utilized for determining location.

Determining the location of femtocell devices may be useful for service providers and for E911 applications, for example. A service provider may provide femtocell services at a particular address, such as at a business address in the building 103, for example, and may wish to ensure that the femtocell device 109 remains at that location and is not relocated to a location outside of the service agreement.

The femtocell 109 may comprise programmable location services, in that it comprises GPS positioning capability and also has LEO positioning capability for when there is insufficient GPS coverage, such as when the device is inside a building. In an exemplary scenario, the device may set to automatically select GPS signals for positioning when available and switch to LEO when necessary, or may be user selectable.

A femtocell with LEO satellite signal positioning capability enables a service provider to monitor the location of the device, and disable the device when not used at the agreed location or locations. The invention is not limited to only femtocell transceivers, and may include VoIP, set-top boxes, gateways, or other equipment where indoor positioning may be mandated or desirable for security and/or spectrum control.

It should be noted that while a femtocell device is illustrated in the figures, any wireless communication service may be utilized, such as WiFi, cellular, or ZigBee, for example.

Figure 1B:
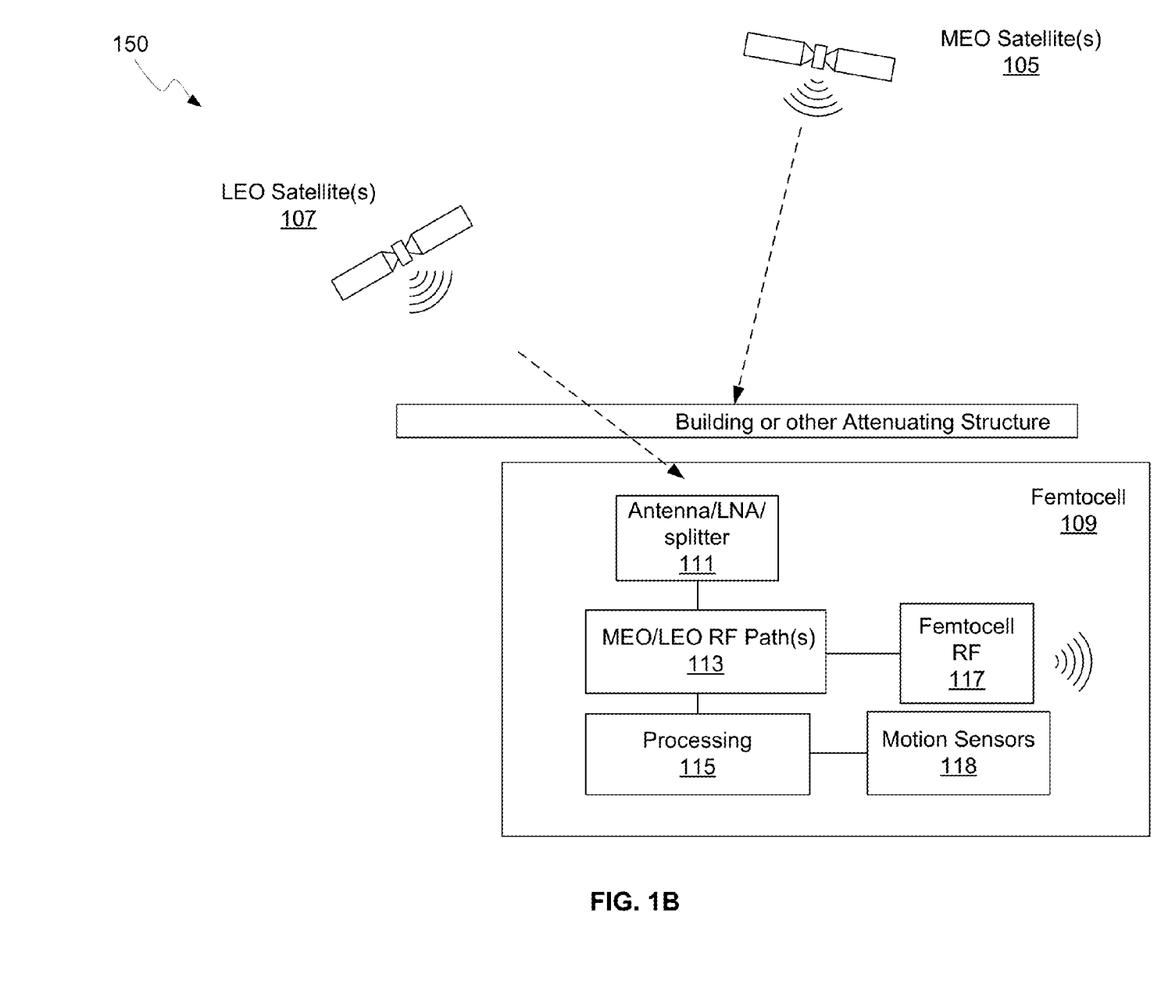
FIG. 1B is a block diagram of an exemplary dual mode global navigation satellite system in accordance with an embodiment of the invention.

FIG. 1B is a block diagram of an exemplary dual mode global navigation satellite system in accordance with an embodiment of the invention. Referring to FIG. 1B, there is shown a global navigation satellite system 150 comprising the femtocell device 109, MEO satellites 105, and LEO satellites 107.

The femtocell device 109 may comprise common RF front end elements such as an antenna/low-noise amplifier (LNA)/signal splitter 111. The femtocell device 109 may also comprise configurable or dual MEO/LEO RF paths 113, a processing block 115, a femtocell RF module 117, and motion sensors 118.

The configurable or dual MEO/LEO RF paths 113 may comprise amplification, down-conversion, filtering, and analog-to-digital conversion capability for received MEO and LEO signals. Portions of the configurable or dual MEO/LEO RF paths 113 may be selectively enabled or disabled utilizing the processing block 115 to conserve power when insufficient signal strength is present.

The femtocell RF module 117 may comprise amplification, down-conversion, up-conversion, filtering, and analog-to-digital conversion capability for communicating wireless signals in a femtocell application or providing wireless services for wireless devices in a building or other structure where cellular and MEO satellite signals are attenuated. The femtocell RF module 117 in conjunction with the MEO/LEO positioning Rx paths 113 enable positioning of the femtocell device 109.

The motion sensors 118 may comprise electro-mechanical devices, such as gyro-sensors, for determining when the femtocell 109 may be in motion. For example, when the femtocell is picked up, the motion sensors 118 may indicate a vertical displacement to the processing block 115.

The processing block 115 may comprise one or more CPUs (e.g. a RISC CPU) for demodulating signals and calculating positioning information, for example, and as such may comprise at least one positioning engine. In an exemplary scenario, the processing block 115 may comprise a MEO satellite signal positioning engine and a LEO satellite positioning engine. Furthermore, the processing block 115 may be operable to compare the RSSI of received LEO satellite signals to expected signal strengths to determine when to use LEO positioning versus MEO positioning.

In an exemplary embodiment, the femtocell device 109 may comprise programmable location services, in that it comprises MEO and LEO positioning capability, so that LEO signals may be utilized for positioning when there is insufficient GPS coverage, such as when the device is inside a building. In an exemplary scenario, the femtocell device 109 may set to automatically select GPS signals for positioning when available and switch to LEO when necessary, or may be user selectable.

The femtocell RF module 117 may be operable to provide wireless services in the vicinity of the device. The positioning capability of the femtocell device 109 enables a user or service provider to define where the femtocell device is authorized to operate. Accordingly, a user or service provider may enter a location or locations where the femtocell 109 is authorized to operate. In an exemplary scenario, the user may enter the coordinates directly, or may click on a map to enter coordinates. In another exemplary scenario, the user may enter an address, which the femtocell or a remote server may translate to coordinates. Upon startup, the femtocell device 109 may determine its position utilizing LEO and/or MEO satellite signals and enable wireless services when the determined position is at or near the authorized locations.

The femtocell may periodically check its position to ensure that the femtocell device has not been moved to an unauthorized location. A pass/fail test may be performed on the determined position and a range of acceptable positions may be known from a radius surrounding the entered position. In instances where the positioning accuracy may be lower, a broader acceptable range may be utilized to avoid incorrect test failure, as described further with respect to FIGS. 1C and 1D.

Figure 1C:
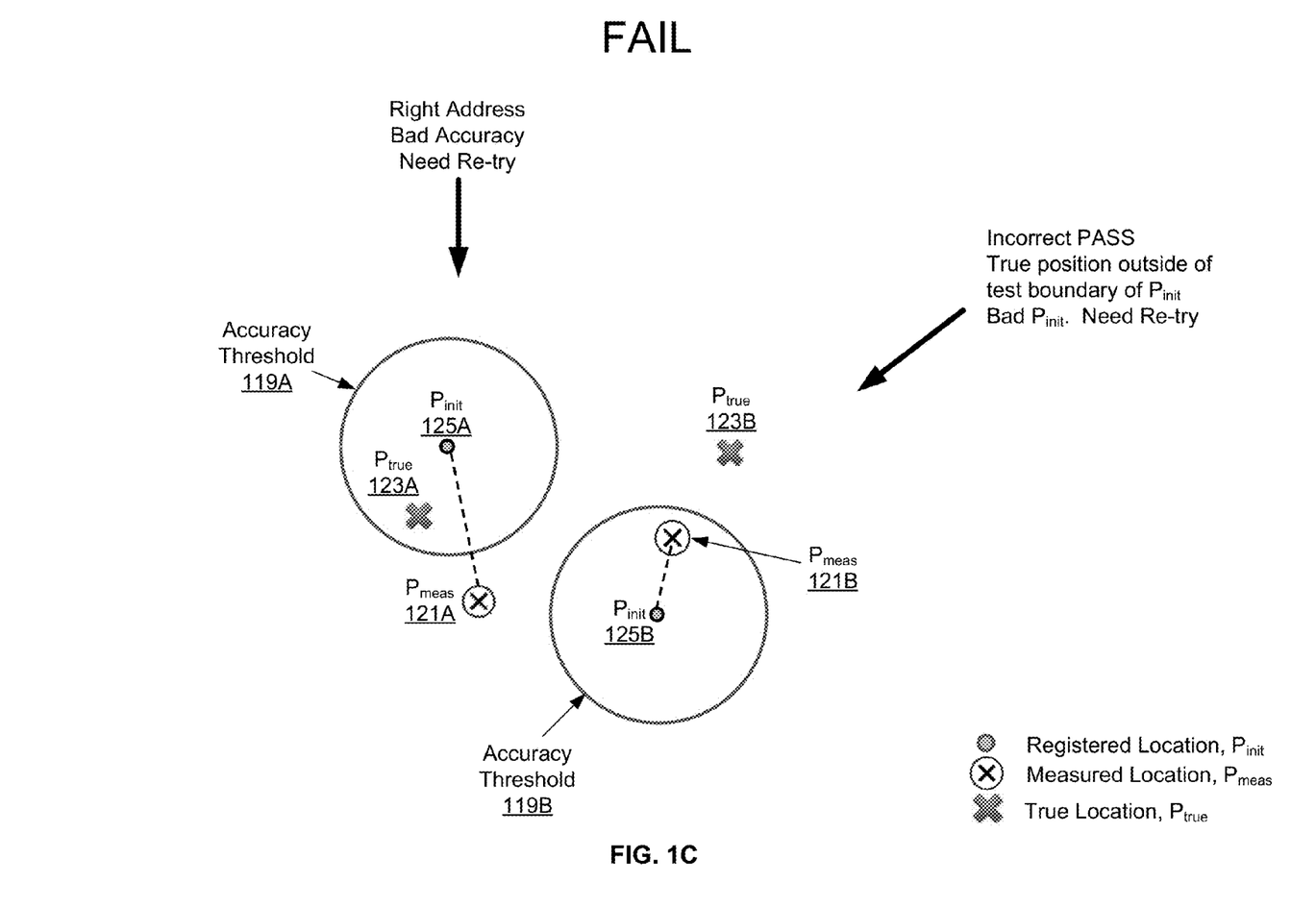
FIG. 1C is a schematic illustrating failed femtocell position verification in accordance with an embodiment of the invention.

FIG. 1C is a schematic illustrating failed femtocell position verification in accordance with an embodiment of the invention. Referring to FIG. 1C, there is shown two position verifications, which may comprise a pass-fail criteria given a user input address translated into latitude, longitude coordinates, for example, and a position measurement made by a LEO satellite Rx.

The position verification process may comprise several steps. First, the user or operator enters the registered address of the femtocell into the provider database as well as in the femtocell transceiver box, which may be stored into non-volatile, non-tamperable memory. The entered address may be referred to as the initialization position, $P_{init}$, and is not the true position of the femtocell device in the home or business, $P_{true}$. In another exemplary scenario, the initial position may be pre-configured, i.e., entered into the system by a manufacturer of the wireless device or by a service provider when purchased or powered up for the first time by the user.

When the user activates the femtocell device at the home, it may boot up and perform a location measurement, $P_{meas}$ 121A or 121B. The femtocell transceiver may then determine if $P_{meas}$ is within a predefined range, or accuracy threshold 119A or 119B, which may be set by the femtocell manufacturer, or not, and apply a pass/fail criteria. If the $P_{meas}$ fails the comparison, it is possible that this is due to a bad accuracy of the positioning performed by the receiver as shown by $P_{meas}$ 121A. In another exemplary scenario, the true position, $P_{true}$ 123B, may actually be outside the boundary set by $P_{init}$ and the accuracy threshold 119B but still result in a Pass result, even though it should have failed. This may be corrected by subsequent positioning calculations. Thus, the user may then be prompted to re-enter an estimate of the true position (i.e., reinitialize the system with $P_{init}=\sim P_{true}$). This may be done using an Internet map tool, where the user points on the map where they think the box is located and then read the latitude and longitude information. Once a new $P_{init}$ is entered, the positioning measurement may be repeated. In instances where the positioning fails the accuracy threshold 119A or 119B multiple failures, up to a predetermined maximum number, the femtocell device may be powered down and disabled until a user contacts a service provider or other authorized entity resets the femtocell device.

Once the femtocell device is located during boot, the full system may be enabled. However, the user may move the box inside the house, to a different house (for example "vacation house"), or to an un-authorized location (e.g. outside of the licensed spectrum). Thus, the femtocell device may need to perform a recheck of its location periodically, or based on system events such as power cycling, motion detected by MEMS sensors such as a digital compass, accelerometers, or gyros. In addition, the femtocell transceiver may perform a position determination on a time-basis (e.g., daily).

Figure 1D:
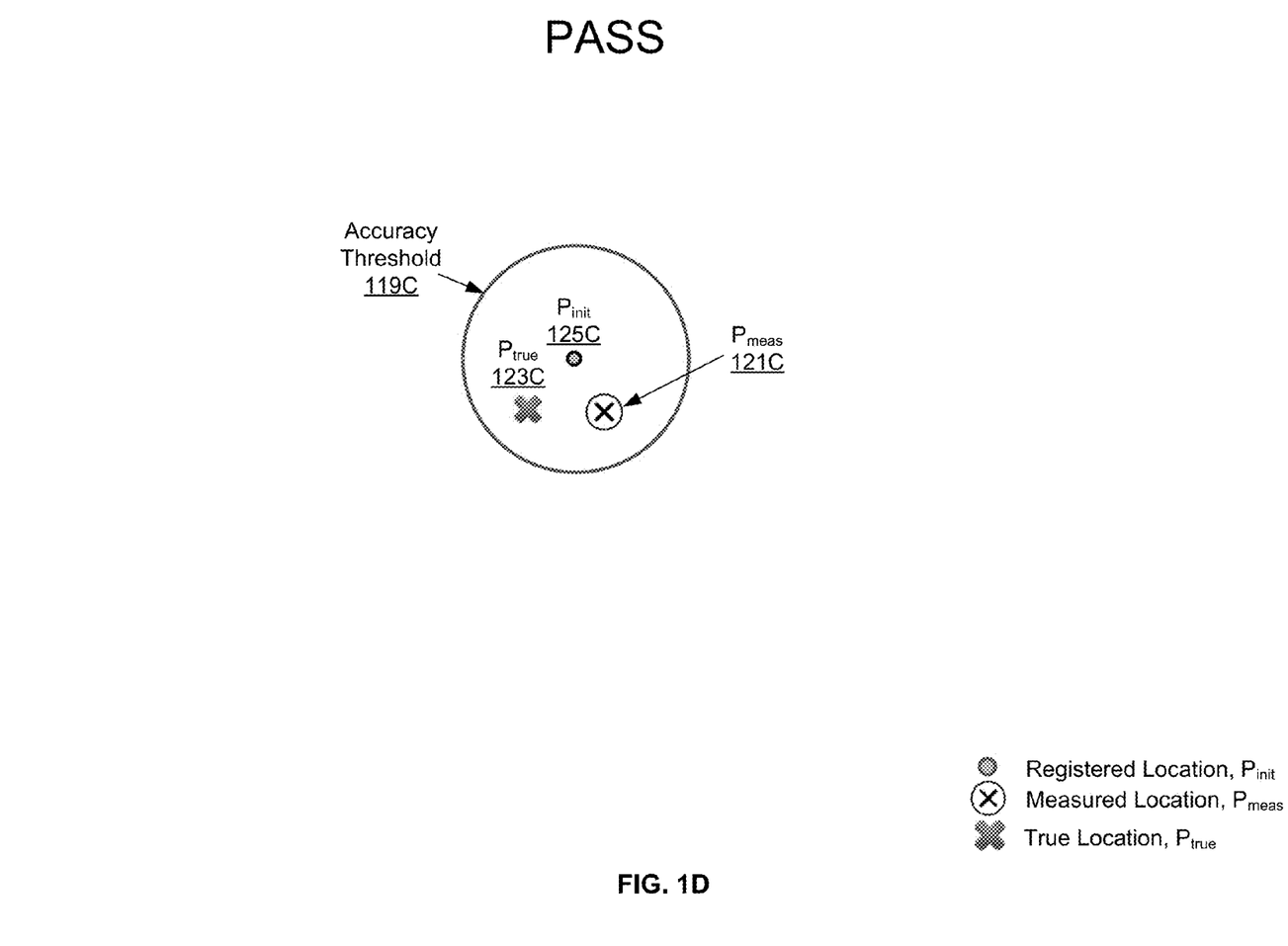
FIG. 1D is a schematic illustrating a successful femtocell position verification in accordance with an embodiment of the invention.

FIG. 1D is a schematic illustrating a successful femtocell position verification in accordance with an embodiment of the invention. Referring to FIG. 1D, there is shown a registered location $P_{init}$ 125C with the accuracy threshold 119C indicated by the circle around $P_{init}$ 125C, a measured location $P_{meas}$ 121C, and a true location, $P_{true}$ 123C. Since the measured location, $P_{meas}$ 121C is within the accuracy threshold 119C determined by the registered location, $P_{init}$ 125C, the position verification passes, and the femtocell transceiver may fully power up with full functionality. This verification may be repeated on a periodic basis and/or whenever the femtocell device powers up. Furthermore, gyro sensors, or other motion sensitive detectors, may initiate a positioning verification when motion is sensed.

Figure 2A:
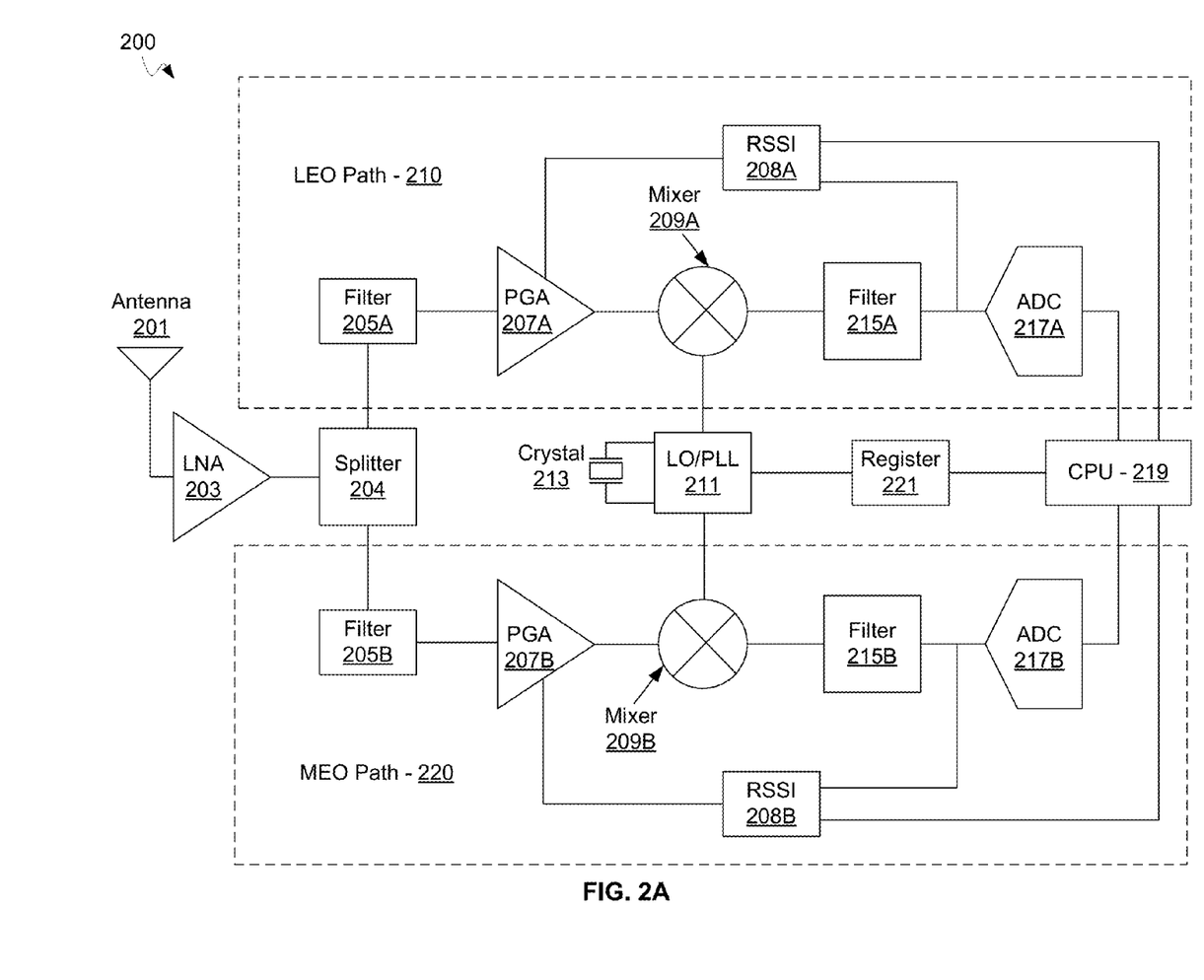
FIG. 2A is a diagram illustrating an exemplary dual mode radio frequency receiver, in accordance with an embodiment of the invention.

FIG. 2A is a diagram illustrating an exemplary dual mode radio frequency receiver, in accordance with an embodiment of the invention. Referring to FIG. 2, there is shown a receiver 200 comprising an antenna 201, a low noise amplifier (LNA) 203, a signal splitter 204, a LEO path 210, a MEO path 220, a local oscillator (LO)/phase locked loop (PLL) 211, a crystal oscillator 213, a central processing unit 219, and a register 221.

The LEO path 210 and MEO path 220 may comprise similar components, configured for different frequencies as needed, such as a programmable gain amplifiers (PGAs) 207A and 207B, receive signal strength indicator modules (RSSI) 208A and 208B, mixers 209A and 209B, filters 215A and 215B, and analog-to-digital converters (ADCs) 217A and 217B.

The antenna 201 may be operable to receive RF signals for subsequent processing by the other elements of the receiver 200. The antenna 201 may comprise a single antenna with wide enough bandwidth to receive both LEO and MEO signals, may comprise a tunable antenna to cover the desired frequency range, or may comprise more than one antenna for receiving signals, each for receiving signals in one of a plurality of frequency ranges.

The LNA 203 may be operable to provide amplification to the signals received by the antenna 201, with the amplified signal being communicated to the splitter 204. The LNA 203 may have a wide enough bandwidth to amplify both MEO and LEO satellite signals or may comprise parallel gain stages for LEO and MEO signals.

The signal splitter 204 may be operable to communicate part of the signal received from the antenna 201 to the LEO path 210 and part to the MEO path 220. This may be achieved by splitting the signal at a certain percentage to each path, such as 50%/50%, for example, or may split the received RF signal based on frequency, such that only MEO signals are communicated to the MEO path 220 and only LEO signals are communicated to the LEO path 210. In another exemplary scenario, separate front ends may be utilized to receive the two types of signals, i.e. a separate antenna and LNA for LEO and MEO signals that communicate the respective signals to the LEO path 210 and the MEO path 220.

The filters 205A and 205B may comprise active or passive filters and may be operable to attenuate signals at frequencies outside a desired range and allow desired signals to pass. For example, the filter 205A may pass LEO satellite signals while filtering out MEO signals.

The PGAs 207A and 207B may provide amplification to signals received from the filters 205A and 205B, and may be configured to operate at MEO or LEO frequencies, or may operate over both frequency ranges, for example. The PGA 207 may be configured by a processor, such as the CPU 219.

The filter modules 205A and 205B may comprise active and/or passive filters for removing unwanted signals while allowing desired signals to pass to the PGAs 207A and 207B. In an exemplary scenario, the filter modules 205A and 205B comprise surface acoustic wave (SAW) filters.

The RSSI modules 208A and 208B may comprise circuitry for determining the magnitude of a received signal, and may sense signal strengths at the PGAs 207A or 207B or for down-converted signals after the filters 215A and 215B, for example. Accordingly, the RSSI modules 208A and 208B may be operable to sense signal strengths at any point along the RF paths in the receiver 200.

The mixers 209A and 209B may comprise circuitry that is operable to generate output signals at frequencies that are the sum and the difference between the input RF signals and the local oscillator signal received from the LO/PLL 211. In an exemplary scenario, the LEO path 210 and the MEO path 220 may comprise two paths each to enable the reception of in-phase and quadrature (I and Q) signals. Accordingly, the mixers 209A and 209B may each comprise two mixers, each receiving LO signals with 90 degree phase difference to the other mixer of the pair.

In another exemplary scenario, the mixers 209A and 209B may down-convert the received RF signals to an intermediate frequency (IF) for further processing, as opposed to down-converting directly to baseband. In this scenario, the filter modules 215A and 215B may comprise a bandpass filter that is configured to pass the desired IF signals while filtering out the undesired low and high frequency signals.

The LO/PLL 211 may comprise circuitry that is operable to generate RF signals to enable down-conversion of RF signals received by the mixers 209A and 209B. The LO/PLL 211 may comprise a voltage-controlled oscillator, for example, with a PLL to stabilize the frequency of the output signal communicated to the mixers 209A and 209B. In an exemplary scenario, the LO/PLL 211 may generate a plurality of LO signals for down-converting I and Q signals in the LEO path 210 and the MEO path 220.

The crystal oscillator 213 may comprise a stable clock source for the receiver 200, and may comprise a piezoelectric crystal, for example, that outputs a stable clock signal at a given temperature. The crystal oscillator 213 may comprise a source for the various LO signals to be communicated to the mixers via the LO/PLL 211.

The ADCs 217A and 217B may comprise circuitry that is operable to convert analog input signals to digital output signals. Accordingly, the ADCs 217A and 217B may receive baseband or IF analog signals from the mixers 209A and 209B and may generate digital signals to be communicated to the CPU 219 for further processing.

The CPU 219 may comprise a processor similar to the processor 113, for example, described with respect to FIG. 1B. Accordingly, the CPU 219 may be operable to control the functions of the receiver 200 and may process received baseband or IF signals to demodulate, decode, and/or perform other processing techniques to the received data. Other processing techniques may comprise positioning calculations based on received satellite signals. The CPU 219 may thus be operable to demodulate and decode both MEO and LEO satellite data, such as GPS and Iridium data.

The CPU 219 may receive RSSI information from the RSSI modules 208A and 208B and may control the gain of the various gain stages in the Rx paths. Similarly, the CPU may control the LO/PLL 211 via the register 221.

The register 221 may comprise a memory register for storing a configuration to be communicated to the LO/PLL to down-convert MEO and/or LEO signals. The register 221 may communicate an output signal to the LO/PLL 211 that indicates the desired frequency signals to down-convert to received RF signals to IF or baseband.

In an exemplary scenario, the receiver 200 may be operable to receive both MEO and LEO satellite signals for positioning purposes. In this manner, the wireless device that comprises the receiver 200 may be capable of determining its position even within a structure that attenuates GPS signals.

In an exemplary scenario, 2-5 bursts from an LEO satellite may be received by the wireless device over a few seconds. The burst may be down-converted and demodulated to extract an accurate clock and satellite orbital data. These may be communicated to a position engine that may calculate the position. Furthermore, once the satellite orbital data is extracted, the Doppler shift may be calculated from the burst intervals compared to the known actual burst intervals, which are known for each satellite.

The extracted clock may be utilized to calibrate the LO/PLL 211 and/or TCXO timing circuits 213 in the wireless communication device 101. This may allow the RF receive paths 210 and 220 to power down occasionally, particularly the MEO (e.g. GPS) RF path 220, since it would not be needed to calibrate the timing circuits.

In an exemplary scenario, the LEO path 210 in the receiver 200 may enable positioning capability even when within structures that attenuate MEO signals below a threshold needed for positioning purposes. This may enable a femtocell device to determine its location even when GPS signals are insufficient such that a user or service provider may configure where a femtocell is authorized to operate.

Figure 2B:
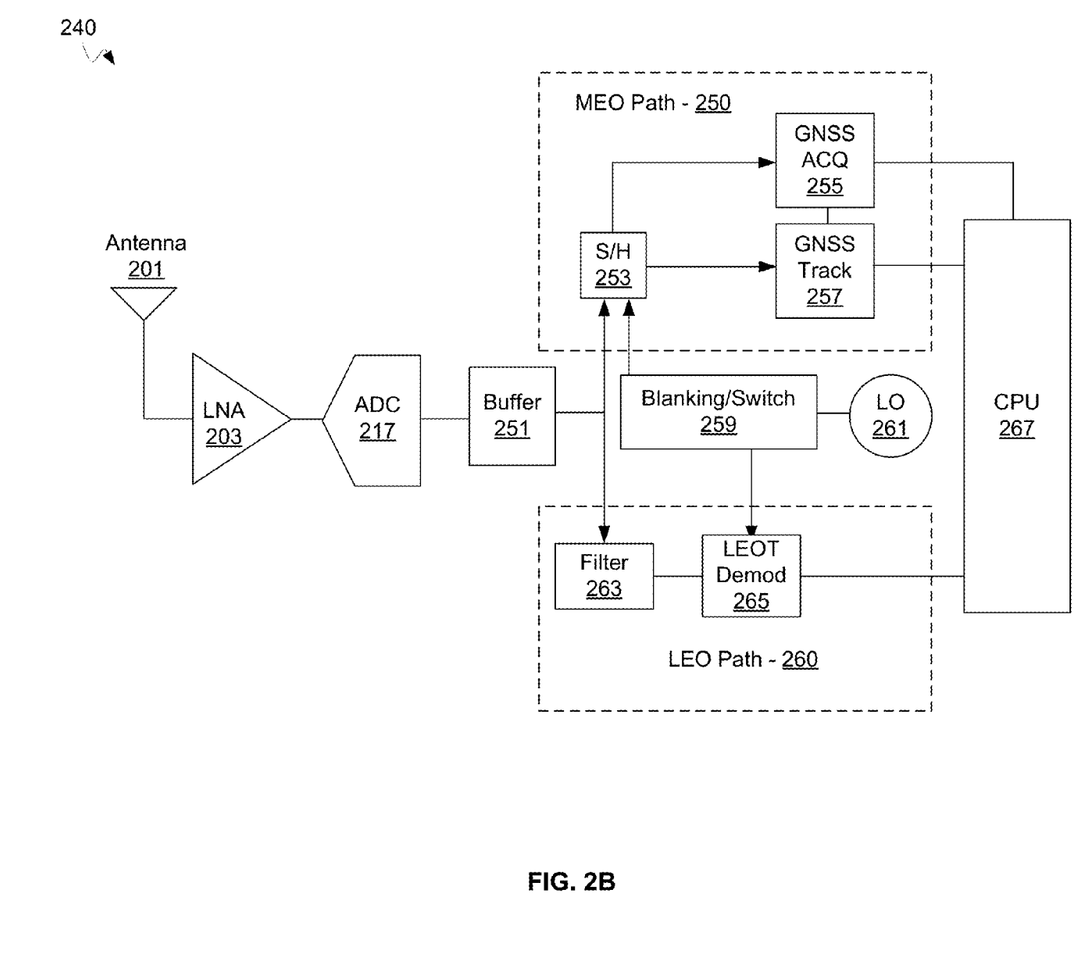
FIG. 2B is a block diagram illustrating a dual-mode time-division duplex satellite receiver, in accordance with an embodiment of the invention.

FIG. 2B is a block diagram illustrating a dual-mode time-division duplex satellite receiver, in accordance with an embodiment of the invention. Referring to FIG. 2B, there is shown an exemplary receiver 240 comprising an antenna 201, a low-noise amplifier (LNA) 203, an analog-to-digital converter (A/D) 217, a buffer 251, and two RF receive paths, a MEO path 250, and a LEO path 260. There is also shown a blanking/switch module 259, a LO/PLL 261 and a central processing unit (CPU) 267.

The MEO path 250 may comprise a sample and hold (S/H) module 253, a GNSS acquisition module 255, and a GNSS tracking module 257. The S/H module 253 may be operable to sample the digital signal from the buffer 251, and hold the sampled value for a configurable time, which may be communicated to the GNSS acquisition module 255 and the GNSS tracking module 257. The S/H module 253 may thus act as a gatekeeper for data to the GNSS acquisition module 255 and the GNSS tracking module 257. This may enable the receiver 250 to switch between MEO and LEO signals without losing a MEO value when receiving LEO signals, for example, and avoid the divergence of the output of the GNSS acquisition module 255 and the GNSS tracking module 257. In another exemplary scenario, the S/H module 253 may output a constant value, a string of zeroes, for example, or any known patter to avoid divergence of the output of the GNSS acquisition module 255 and the GNSS tracking module 257.

The GNSS acquisition module 255 may be operable to acquire a lock to one or more GNSS satellites, which may allow the GNSS tracking module 257 to determine and track the location of the receiver. The GNSS acquisition module 255 may detect LEO frequency signals above a threshold signal strength and extract an accurate clock by determining the code-division multiple access (CDMA) collision avoidance (CA) code for the received data. A determined satellite ID and C code may be used by the GNSS tracking module 257 for accurate positioning purposes.

Similarly, the LEO path 260 may comprise a filter 263 and a LEO timing signal demodulator module 265. The LEO timing signal demodulator module 265 may receive filtered MEO signals from the filter 263 and may demodulate the received signal to an accurate clock from the transmitting satellite. This accurate clock along with information regarding the satellite orbit may be utilized for positioning. In this manner either MEO or LEO signals, or both, may be utilized for positioning purposes.

The LEO timing demodulator 265, the GNSS acquisition module 255, and the GNSS tracking module 257 may communicate output signals to the CPU for further processing or use of the determined timing and/or positioning data.

The blanking/switching module 259 may be operable to provide the TDD function for the receiver, switching the LEO path 260 on and off and blanking the MEO path 250 by configuring the output of the S/H module 253 to retain the previous data to the GNSS acquisition module. The LO/PLL 261 may provide a timing signal for the blanking/switch module.

The filter 263 may be operable to filter out unwanted signals allowing the desired satellite RF signal to pass to the LEOT demodulator module 265. The LEO timing demodulator may be operable to extract an accurate timing signal from the received LEO signals, which along with satellite ephemeris data, may be utilized by the CPU 267 for positioning purposes.

In an exemplary scenario, the LEO path 260 in the receiver 240 may enable positioning capability even when within structures that attenuate MEO signals below a threshold needed for positioning purposes. This may enable a femtocell device to determine its location even when GPS signals are insufficient such that a user or service provider may configure where a femtocell is authorized to operate.

Figure 3:
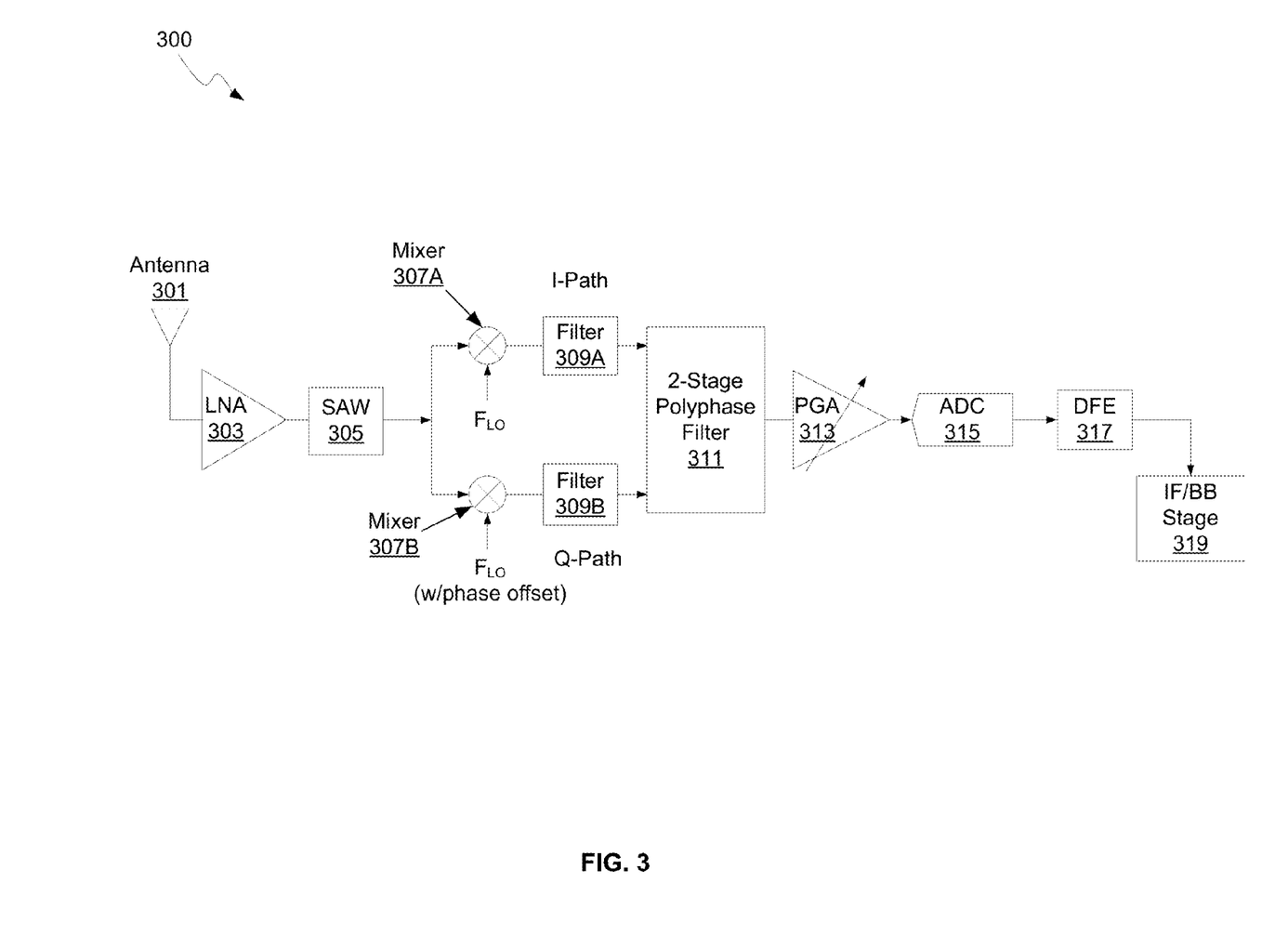
FIG. 3 is a diagram illustrating an exemplary in-phase and quadrature RF front end, in accordance with an embodiment of the invention.

FIG. 3 is a diagram illustrating an exemplary in-phase and quadrature RF front end, in accordance with an embodiment of the invention. Referring to FIG. 3, there is shown the I and Q RF path 300 comprising an antenna 301, an LNA 303, a SAW filter 305, mixers 307A and 307B, filters 309A and 309B, a 2-stage polyphase filter 311, a PGA 313, an ADC 315, a digital front end (DFE) 317, and an IF/baseband stage 319. The antenna 301, the LNA 303, the SAW filter 305, the mixers 307A and 307B, the filters 309A and 309B, the PGA 313, and the ADC 315 may be substantially similar to similarly named elements described with respect to FIG. 2.

The mixers 307A and 307B may receive input signals from the SAW filter 305 and local oscillator signals at frequency $F_{LO}$, and 90 degree phase difference, to down-convert the received I and Q signals.

The 2-stage polyphase filter 311 may comprise circuitry for providing I and Q signal image rejection of intermediate or baseband signals received from the filters 309A and 309B. This has an advantage over integrating filters prior to the mixers 307A and 307B to reduce image signals because this would require very high Q factors. The 2-stage polyphase filter 311 may comprise a notch frequency of $-F_{IF}$.

In an exemplary scenario, the ADC 315 may comprise a sigma-delta converter. The DFE 317 may comprise circuitry that is operable to decimate the digital signal received from the ADC 315. In an exemplary scenario, the ADC 315 may generate a 1-bit output signal at a frequency $F_{ADC}$, and the DFE 317 may then decimate the received signal by 16 to result in a 6 bit IF signal with a sampling frequency of $F_{LO}/96$.

The IF/baseband stage 319 may comprise circuitry for further processing of the IF or baseband signals received from the DFE 317. For example, if the DFE 317 output signal is an IF signal, the IF/baseband stage 319 may comprise further down-conversion capability. In addition, the IF/baseband stage 319 may comprise filtering and decimation capability for further processing of the received signals.

In operation, the I and Q RF path 300 may receive an RF signal via the antenna 301. The LNA 303 may provide amplification to the received signal before being filtered by the SAW filter 305. The SAW filter 305 may comprise a filter with wide enough bandwidth for both LEO and MEO signals or may be configurable to different frequency ranges. In another exemplary scenario, the SAW filter 305 may comprise a plurality of filters that may be selectively enabled so that only desired signals are passed to the mixers 307A and 307B.

The mixers 307A and 307B may receive the filtered RF signals and local oscillator signals $F_{LO}$ that are 90 degrees out of phase for down-converting I and Q signals to IF or baseband frequencies. The resulting IF or baseband signals may be filtered by the filters 309A and 309B and the 2-stage polyphase filter 311 before being amplified by the PGA 313. The 2-stage polyphase filter 311 may provide image rejection in instances where image signals interfere with the desired signals. The PGA 313 may receive a gain control signal from a processor, such as the CPU 219 described with respect to FIG. 2A.

The ADC 315 may convert the amplified and filtered IF/baseband signal to a digital signal for further processing in the digital domain. For example, the DFE 317 and the IF/baseband stage 319 may decimate and filter the digital signal received from the ADC 315. In addition, the IF/baseband stage 319 may comprise a positioning engine for determining the location of the wireless device comprising the I and Q RF front end 300. The position may be determined from accurate timing signals received from a plurality of LEO or MEO satellite signals in conjunction with ephemeris data for the satellites.

In an exemplary scenario, the I and Q RF path 300 may receive LEO satellite signals. The received LEO signals may enable positioning capability even when within structures that attenuate MEO signals below a threshold needed for positioning purposes. This may enable a femtocell device to determine its location even when GPS signals are insufficient such that a user or service provider may configure where a femtocell is authorized to operate.

Figure 4:
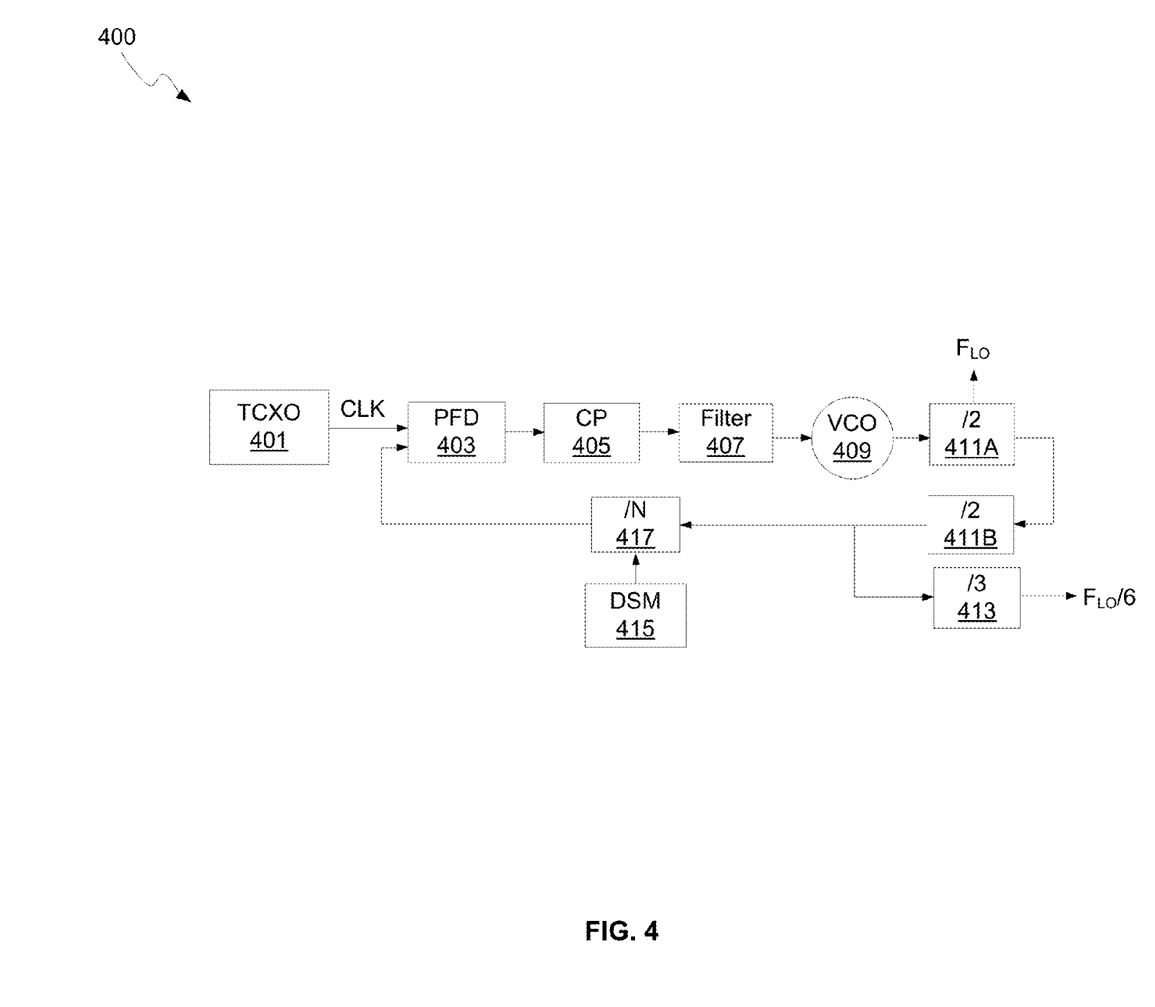
FIG. 4 is a diagram illustrating an exemplary phase locked loop, in accordance with an embodiment of the invention.

FIG. 4 is a diagram illustrating an exemplary phase locked loop, in accordance with an embodiment of the invention. Referring to FIG. 4, there is shown a phase locked loop (PLL) 400 comprising a temperature-compensated crystal oscillator (TXCO) 401, a phase-frequency detector (PFD) 403, a charge pump 405, a loop filter 407, a voltage-controlled oscillator (VCO) 409, divide-by-2 modules 411A and 411B, a divide-by-3 module 413, a delta-sigma modulator (DSM) 415, and a fractional-N divider 417. There is also shown a clock signal CLK and output signals $F_{LO}$ and $F_{LO}/6$.

The TCXO 401 may comprise a crystal oscillator that is capable of providing a stable clock signal, CLK, over an operational temperature range. The TCXO 401 may thus provide the base clock signal for the PLL 400 that is communicated to the PFD 403.

The PFD 403 may comprise circuitry that is operable to sense a phase difference between received input signals, such as the signals received from the TCXO 401 and the fractional-N divider 417. The PFD 403 may output a phase error signal, which is proportional to the phase difference between the two input signals. This error signal may be communicated to the charge pump 405 for adjustment purposes.

The charge pump 405 may comprise circuitry that is operable to adjust a frequency of the VCO 409 via the filter 407. The charge pump 405 may receive an error signal from the PFD 403 that is proportional to the phase difference between input clock signals. Accordingly, the charge pump 405 may generate an output signal that increases or decreases the oscillation frequency of the VCO 409.

The loop filter 407 may comprise a low-pass filter, for example, that filters out noise signals and allows a control signal to pass from the charge pump 405 to the VCO 409. Removing spurious signals and noise fluctuations may increase the stability of the PLL 400.

The VCO 409 may comprise circuitry that is operable to generate a clock signal at a frequency configured by an input voltage. Accordingly, the frequency of the output signal generated by the VCO 409 may be proportional to the magnitude of the voltage of the input signal received from the charge pump 405 via the loop filter 407. The output signal may then be communicated to the divide-by-2 modules 411A and 411B, which may comprise frequency dividers. The divide-by-2 module 411A may generate an output signal $F_{LO}$, which may correspond to the $F_{LO}$ described with respect to FIG. 3, and may also communicate an output signal to the divide-by-2 module 411B for a second halving of the frequency.

The divide-by-2 module 411B may communicate an output signal to the divide-by-3 module 413 and the fractional-N divider 417. The divide-by-3 module 413 may divide the frequency again by 3, resulting in an output signal $F_{LO}/6$. The fractional-N divider 417 may divide the frequency of the input signal by a configurable factor, thereby enabling accurate frequency control of the PLL 400 over a plurality of steps in a frequency range.

The fractional-N divider 417 may receive a modulus control signal from the DSM 415. The value of N may be configured to hop between two values so that the VCO 409 alternates between one locked frequency and the other. The VCO 409 may then stabilize at a frequency that is the time average of the two locked frequencies. By varying the percentage of time that the fractional-N divider 417 spends at the two divider values, the frequency of the locked VCO 409 may be configured with very fine granularity.

In an exemplary scenario, the DSM 415 may enable the PLL 400 to hop between frequencies in a pseudo-random fashion to create noise shaping that reduces the phase noise of the system. The PLL 400 may thus be operable to provide a plurality of stable clock signals based on a TCXO output, and with small incremental steps in output frequency configured by the fractional-N divider 417. The output of the divide-by-3 module 413 may comprise a clock signal for the ADC 315, for example, as described with respect to FIG. 3.

The configurable PLL 400 may enable the reception of LEO and MEO signals. The reception of LEO satellite signals may enable positioning capability even when within structures that attenuate MEO signals below a threshold needed for positioning purposes. This may enable a femtocell device to determine its location even when GPS signals are insufficient such that a user or service provider may configure where a femtocell is authorized to operate.

Figure 5:
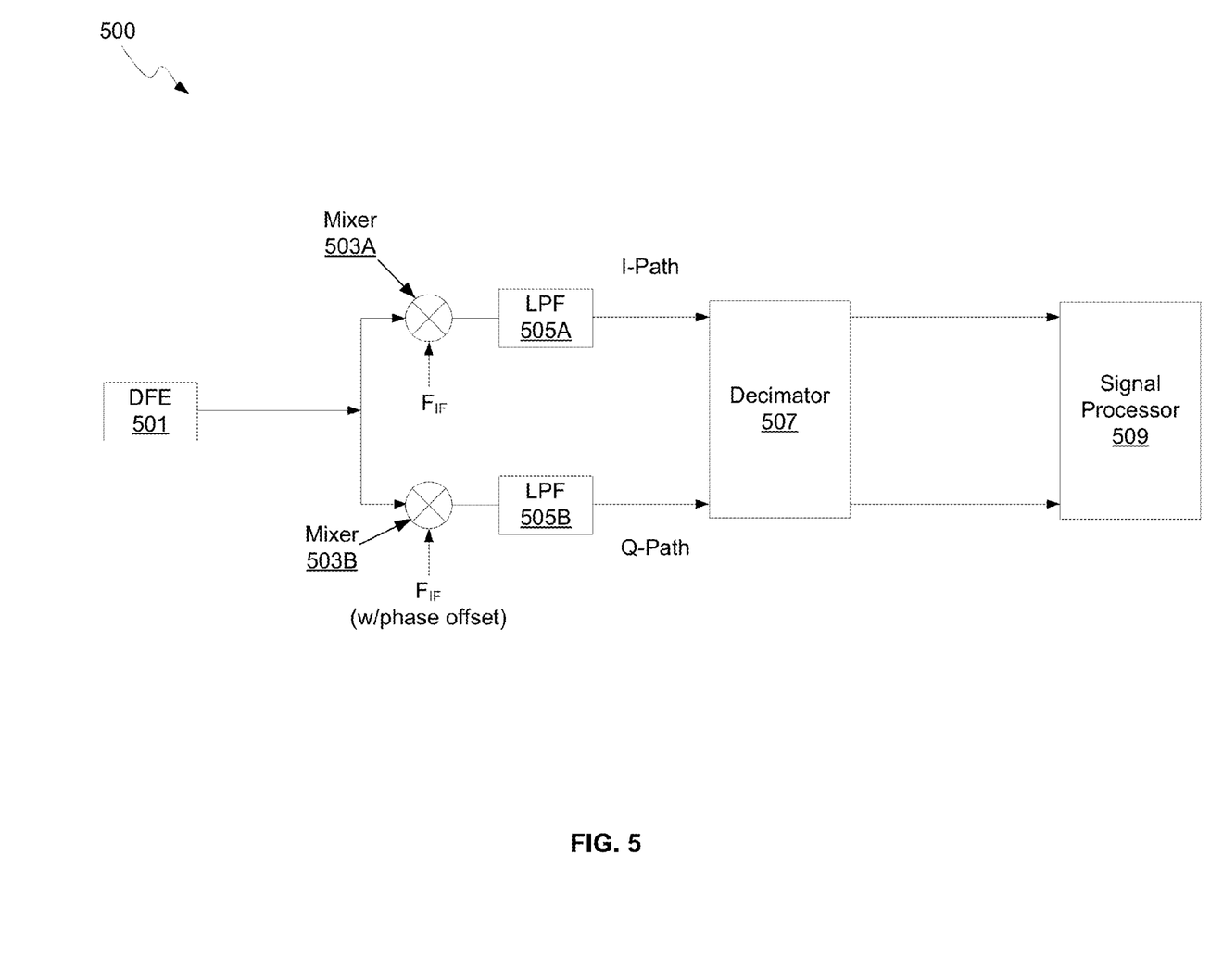
FIG. 5 is a diagram illustrating an exemplary intermediate frequency path, in accordance with an embodiment of the invention.

FIG. 5 is a diagram illustrating an exemplary intermediate frequency path, in accordance with an embodiment of the invention. Referring to FIG. 5, there is shown an IF path 500 comprising a DFE 501, mixers 503A and 503, low-pass filters 505A and 505B, a decimator 507, and a signal processor 506.

The IF path 500 may correspond to the DFE 317 and the IF/baseband stage 319 as described with respect to FIG. 3, for example. Similarly, the mixers 503A and 503B may be substantially similar to the mixers 307A and 307B of FIG. 3, for example, but with different local oscillator frequencies. For example, the mixers 503A and 503B may receive local oscillator signals FIF, and FIF with a 90 degree phase shift, respectively, to down-convert an IF signal to baseband for further processing by the decimator 507 and the signal processor 509.

The LPFs 505A and 505B may be operable to filter out higher frequency signals while allowing low frequency, or baseband, signals to pass. The decimator 507 may comprise circuitry that is operable to reduce the sampling rate of the digital input signal. For example, the decimator 507 may decimate the sampling rate by a factor of 64, before communicating the resulting signal to the signal processor 509.

The signal processor 509 may comprise a CPU, for example, that may be operable to calculate positioning and navigation information from received satellite signals. For example, the signal processor 509 may be comprise an assisted-GPS positioning engine that is operable to calculate the position of the wireless device 101 from received LEO or MEO satellite signals and stored and/or retrieved ephemeris data.

By enabling the down-conversion of both MEO and LEO signals, the signal processor 509 may determine position and navigation information in areas where MEO signals are too attenuated. Similarly, the signal processor 509 may alternate between MEO and LEO signal data or use data from one signal type to assist in the positioning calculation and/or timing synchronization of the other type of signal. The configuration of a wireless device to receive both LEO and MEO signals may greatly reduce space requirements as the configurable RF path 111 may be integrated on a single chip, as opposed to multiple RF paths, each for a different signal type.

The reception of LEO satellite signals via the IF path 500 may enable positioning capability even when within structures that attenuate MEO signals below a threshold needed for positioning purposes. This may enable a femtocell device to determine its location even when GPS signals are insufficient such that a user or service provider may configure where a femtocell is authorized to operate.

Figure 6:
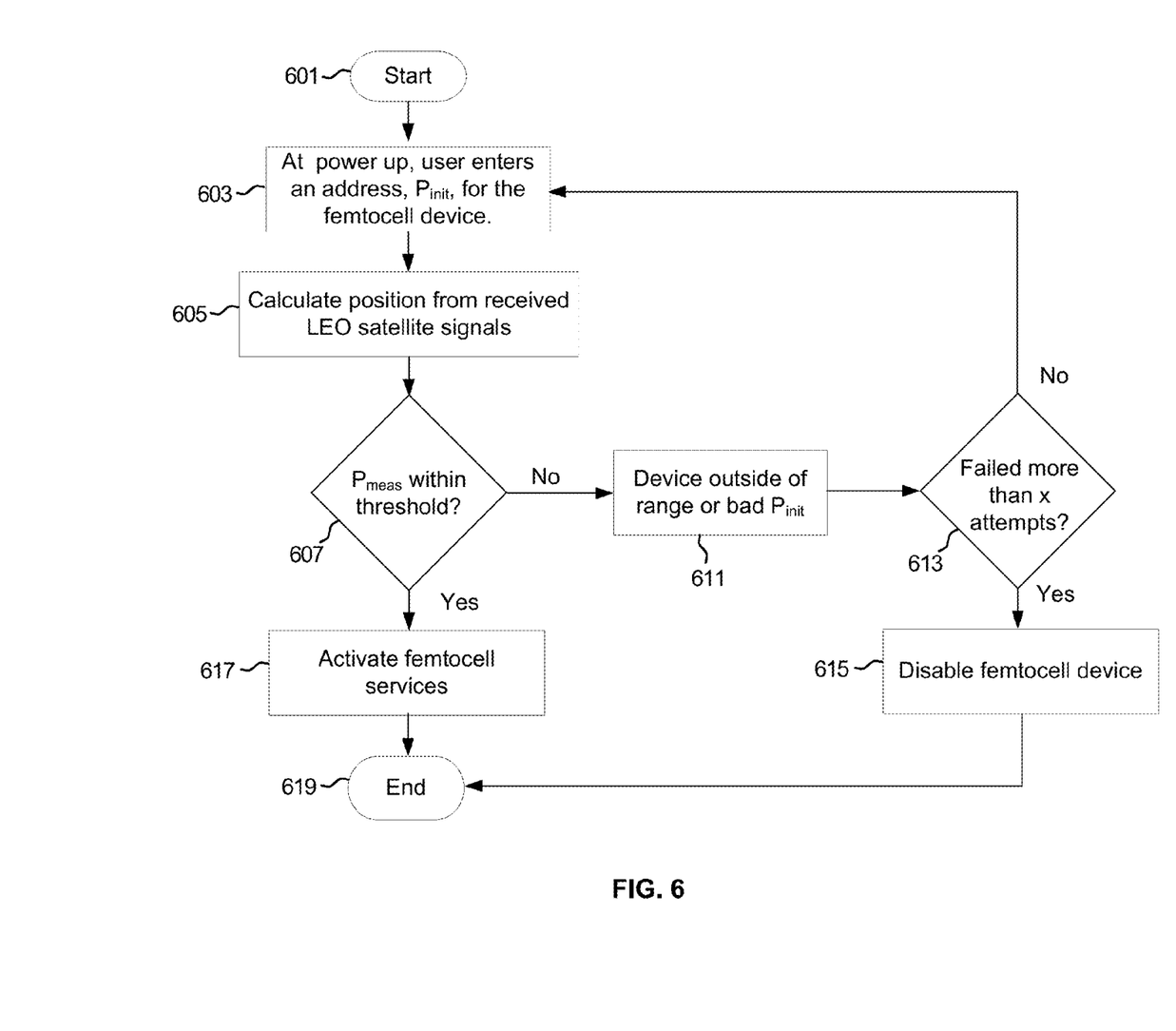
FIG. 6 is a block diagram illustrating exemplary steps for femtocell positioning utilizing low Earth orbit satellite signals, in accordance with an embodiment of the invention.

FIG. 6 is a block diagram illustrating exemplary steps for femtocell positioning utilizing low Earth orbit satellite signals, in accordance with an embodiment of the invention. The exemplary method illustrated in FIG. 6 may, for example, share any or all functional aspects discussed previously with regard to FIGS. 1-5.

Referring to FIG. 6, after start step 601, in step 603, at power up, a user enters an address or initial position, $P_{init}$, indicating where the femtocell device is located. A threshold radius may be defined by the user or a service provider within which the femtocell is authorized to operate. In step 605, the femtocell device may determine its location utilizing received LEO satellite signals.

If, in step 607, the measured position, $P_{meas}$, is not within the desired radius, the measurement may be inaccurate or an incorrect address may have been entered, and the exemplary steps may proceed back to step 613 where it may be determined if the position test has failed more that X times, where X is a predetermined number of times that the positioning test may fail before the femtocell device is disabled. In step 613, if the positioning test has not failed more than X times, the exemplary steps may proceed back to step 603 for the user to reenter the initial position, $P_{init}$.

If in step 613 the positioning test has failed more than X times, the exemplary steps may proceed to step 615 where the femtocell device may be disabled, followed by end step 619.

In step 607, if the determined position is within the threshold radius, the exemplary steps may proceed to step 617 where the femtocell device may finish starting up and provide wireless services, followed by end step 619.

In an embodiment of the invention, a method and system may comprise receiving an initial position of a wireless communication device 109 as entered by as user, manufacturer of the wireless device, or a service provider, wherein the wireless communication device 109 comprises a low Earth orbit (LEO) satellite signal receiver path 210, 260, 300, 500. The wireless communication device 109 may be operable to provide wireless communication services to other wireless communication devices 101. LEO RF satellite signals may be received utilizing the LEO satellite signal receiver path 210, 260, 300, 500 and a position of the wireless communication device 109 may be measured based on the received LEO RF satellite signals.

The measured position of the wireless communication device 109 may be compared to a threshold radius 119A-119C defined by the initial position 125A-125C and the wireless communication services to the other wireless communication devices 101 may be enabled when the measured position 121A-121C is within the threshold radius 119A-119C. Reentry of the initial position 125A-125C may be requested when the measured position 121A-121C is outside of the threshold radius 119A-119C and the wireless communication device 109 may be disabled when the measured position 121A-121C of the wireless communication device 109 falls outside of the threshold radius 119A-119C more than a predetermined number of times.

The wireless communication device 109 may comprise a femtocell device, a WiFi access point, or may provide cellular telephone service to the other wireless communication devices 101. The position of the wireless communication device 109 may be measured upon powering up of the wireless communication device 109. The position of the wireless communication device 109 may be measured on a periodic basis. The position of the wireless communication device 109 may be measured when one or more motion sensors 118 in the wireless communication device 109 detect motion. The wireless communication device 109 may be controlled by a reduced instruction set computing (RISC) central processing unit (CPU) 115, 219, 267, 509.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for femtocell positioning using low Earth orbit satellite signals.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a wireless communication device comprising a low Earth orbit (LEO) satellite signal receiver path and a medium Earth orbit (MEO) path, said wireless communication device being operable to provide wireless communication services to other wireless communication devices:
      receiving LEO RF satellite signals utilizing said LEO satellite signal receiver path when MEO signals are attenuated below a threshold needed for positioning purposes by the MEO receiver path;
      measuring a position of said wireless communication device based on said received LEO RF satellite signals;
      comparing said measured position of said wireless communication device to a threshold radius defined by a stored initial position; and
      enabling said wireless communication services to said other wireless communication devices when said measured position is within said threshold radius.

2. The method according to claim 1, comprising requesting reentry of said stored initial position when said measured position is outside of said threshold radius.

3. The method according to claim 1, comprising disabling said wireless communication device when said measured position of said wireless communication device falls outside of said threshold radius more than a predetermined number of times.

4. The method according to claim 1, wherein said wireless communication device comprises one or more of: a femtocell device or a wireless local area network (WLAN) access point.

5. The method according to claim 1, wherein said stored initial position is entered by one of: a user, a service provider, or a manufacturer of said wireless communication device.

6. The method according to claim 1, wherein said stored initial position is entered by one or more of: manually entering coordinates, clicking on a map, and entering an address.

7. The method according to claim 1, wherein said wireless communication device provides cellular telephone service to said other wireless communication devices.

8. The method according to claim 1, comprising measuring said position of said wireless communication device upon powering up of said wireless communication device.

9. The method according to claim 1, comprising measuring said position of said wireless device on a periodic basis.

10. The method according to claim 1, comprising measuring said position of said wireless communication device when one or more motion sensors in said wireless communication device detect motion.

11. The method according to claim 1, wherein said wireless communication device is controlled by a reduced instruction set computing (RISC) central processing unit (CPU).

12. A system for wireless communication, the system comprising:
   one or more circuits for use in a wireless communication device comprising a low Earth orbit (LEO) satellite signal receiver path and a medium Earth orbit (MEO) path, said one or more circuits being operable to provide wireless communication services to other wireless communication devices, and said one or more circuits being operable to:
      receive LEO RF satellite signals utilizing said LEO satellite signal receiver path when MEO signals are attenuated below a threshold needed for positioning purposes by the MEO receiver path;
      measure a position of said wireless communication device based on said received LEO RF satellite signals;
      compare said measured position of said wireless communication device to a threshold radius defined by a stored initial position; and
      enable said wireless communication services to said other wireless communication devices when said measured position is within said threshold radius.

13. The system according to claim 12, wherein said one or more circuits are operable to request reentry of said stored initial position when said measured position is outside of said threshold radius.

14. The system according to claim 12, wherein said one or more circuits are operable to disable said wireless communication device when said measured position of said wireless communication.

15. The system according to claim 12, wherein said wireless communication device comprises one or more of: a femtocell device or a wireless local area network (WLAN) access point.

16. The system according to claim 12, wherein said stored initial position is entered by one of: a user, a service provider, or a manufacturer of said wireless communication device.

17. The system according to claim 12, wherein said stored initial position is entered by one or more of: manually entering coordinates, clicking on a map, and entering an address.

18. The system according to claim 12, wherein said wireless communication device provides cellular telephone service to said other wireless communication devices.

19. The system according to claim 12, wherein said one or more circuits are operable to measure said position of said wireless communication device upon powering up of said wireless communication device and/or on a periodic basis.

20. The system according to claim 12, wherein said one or more circuits are operable to measure said position of said wireless communication device when one or more motion sensors in said wireless communication device detect motion.

21. The system according to claim 12, wherein said wireless communication device is controlled by a reduced instruction set computing (RISC) central processing unit (CPU).

22. A system for wireless communication, the system comprising:
   one or more circuits for use in a femtocell device comprising a low Earth orbit (LEO) satellite signal receiver path and a medium Earth orbit (MEO) receiver path, said one or more circuits being operable to provide wireless communication services to other wireless communication devices, and said one or more circuits being operable to:
      receive LEO RF satellite signals utilizing said LEO satellite signal receiver path when MEO signals are attenuated below a threshold needed for positioning purposes by the MEO receiver path;

measure a position of said femtocell device based on said received LEO RF satellite signals;

compare said measured position of said femtocell device to a threshold radius defined by a stored initial position; and enable said wireless communication services to said other wireless communication devices when said measured position is within said threshold radius.

\* \* \* \* \*